US007936836B2

(12) United States Patent
Yin

(10) Patent No.: US 7,936,836 B2
(45) Date of Patent: May 3, 2011

(54) METHOD AND APPARATUS FOR AN OFDMA PARALLEL ARCHITECTURE SCHEDULER

(75) Inventor: Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 11/902,948

(22) Filed: Sep. 26, 2007

(65) Prior Publication Data

US 2009/0080544 A1    Mar. 26, 2009

(51) Int. Cl.
*H04K 1/10* (2006.01)
*H04L 27/00* (2006.01)

(52) U.S. Cl. ........................................ 375/260; 375/259
(58) Field of Classification Search .................. 375/260, 375/259

See application file for complete search history.

(56) References Cited

U.S. PATENT DOCUMENTS

| 7,058,002 | B1 * | 6/2006 | Kumagai et al. | 370/203 |
| 2006/0079240 | A1 * | 4/2006 | Fitzek et al. | 455/450 |
| 2007/0207810 | A1 * | 9/2007 | Cho et al. | 455/450 |
| 2008/0080465 | A1 * | 4/2008 | Pajukoski et al. | 370/342 |

* cited by examiner

*Primary Examiner* — David C Payne
*Assistant Examiner* — Brian J Stevens
(74) *Attorney, Agent, or Firm* — Shiloh et al.

(57) ABSTRACT

A method and apparatus for calculating an optimal sub-channel allocation of Orthogonal Frequency Division Multiple Access (OFDMA) from a first bipartite graph that may map users, to a second bipartite graph that may map additional users, including original users. A calculation of each bipartite graph may include a calculation of maximum weight paths and matchings. Using a bipartite graph method for OFDMA sub-channel allocation may improve the time and complexity when establishing an OFDMA wireless system.

19 Claims, 4 Drawing Sheets

METHOD AND APPARATUS FOR AN OFDMA PARALLEL ARCHITECTURE SCHEDULER

FIELD OF THE INVENTION

The present invention relates to wireless communication, and in particular to channel allocation management.

BACKGROUND OF THE INVENTION

In Orthogonal Frequency Division Multiple Access (OFDMA) broadband wireless systems resource blocks may consist of groups of sub-carriers, sub-channels or chunks in frequency. Symbols or groups of symbols may be referred to as slots or sub-frames in time. OFDMA systems may assign a unique sub-channel to a single user. Sub-channel assignments and modification of these assignments, including adding and removing users, are typically performed by a sequential algorithm that may be highly complex or take a long time to implement.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
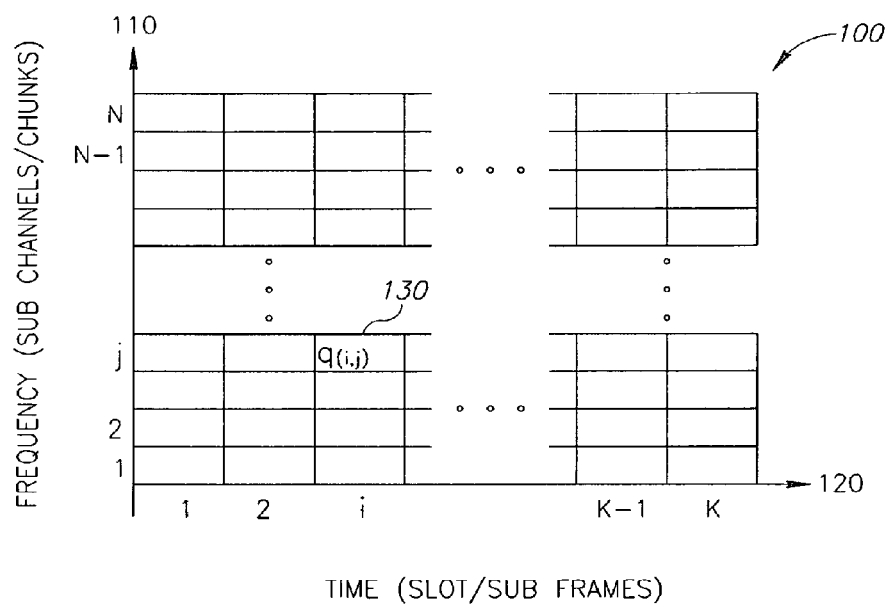
FIG. 1 is an exemplary graph illustrating a distribution of OFDMA signals.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However, it will be understood by those of ordinary skill in the art that the embodiments of the invention may be practiced without these specific details. In other instances, well-known methods, procedures, and components have not been described in detail so as not to obscure the present invention.

A data process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless explicitly stated, the method embodiments described herein are not constrained to a particular order or sequence. Additionally, some of the described method embodiments or elements thereof can occur or be performed at the same point in time.

FIG. 1 is an exemplary graph illustrating a distribution of signals 100 according to an embodiment of the invention. According to an embodiment of the invention, Orthogonal Frequency Division Multiple Access (OFDMA) may be used, and may allow multiple users to communicate simultaneously. Any common protocol that may use OFDMA may be used, for example, Third Generation Partnership Project Long Term Evolution (3GPP LTE), Wireless Metropolitan Area Network (WirelessMAN), or Worldwide Interoperability for Microwave Access (WiMAX), or any other OFDMA protocol. Each user, 1 to N, may be assigned a frequency, or sub-channel or chunk, j, and these sub-channels may be depicted along graph axis 110. Users may communicate information fragments or packets, 1 to K, by grouping the information into slots or sub-frames, i, and these sub-frames may be depicted along graph axis 120. An individual element of data, i, that may correspond to an individual user, j, may be represented by q(i,j) 130. Any other organization of data and users 100 that may be used by an OFDMA communication protocol are possible possible and within the scope of the invention.

Figures 2A, 2B:
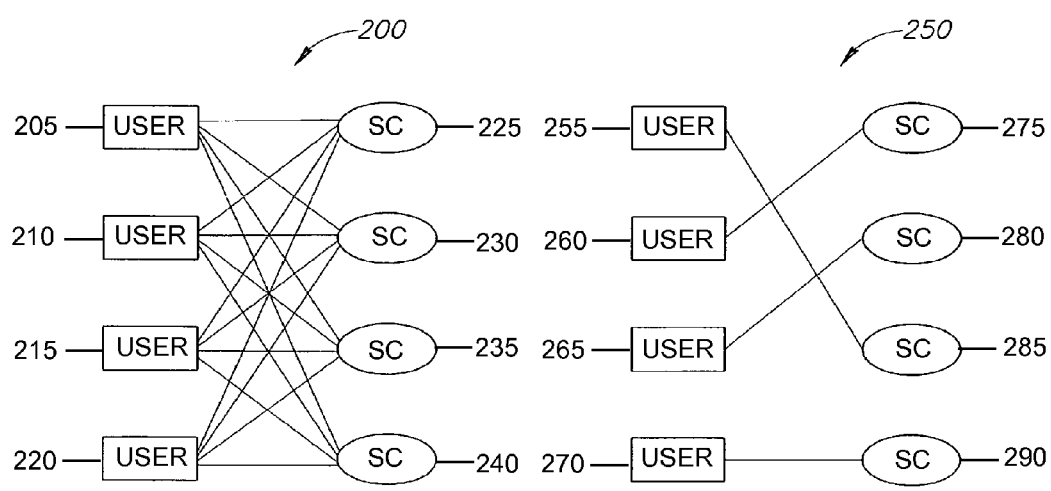
FIGS. 2A and 2B are an exemplary block diagram illustrating connections of mobile users to sub-channels.

FIGS. 2A and 2B are block diagrams illustrating connections of users to sub-channels. channels. FIG. 2A is an exemplary block diagram 200 illustrating all possible connections of users 205, 210, 215 and 220 to sub-channels 225, 230, 235 and 240 that may be available for an OFDMA communication protocol to select from. Prior to application of an OFDMA protocol any user 205, 210, 215 and 220 may be available to be connected to any sub-channel 225, 230, 235 and 240. FIG. 2B is an exemplary block diagram 250 illustrating a possible set of connections 295 that may be applied to users 255, 260, 265 and 270 in order to operate an OFDMA communication protocol, where each user may be assigned to a unique sub-channel 275, 280, 285 and 290. The assignment of a user to a sub-channel may be performed in order to achieve a high Signal-to-Interference Plus Noise Ratio (SINR).

Figure 3:
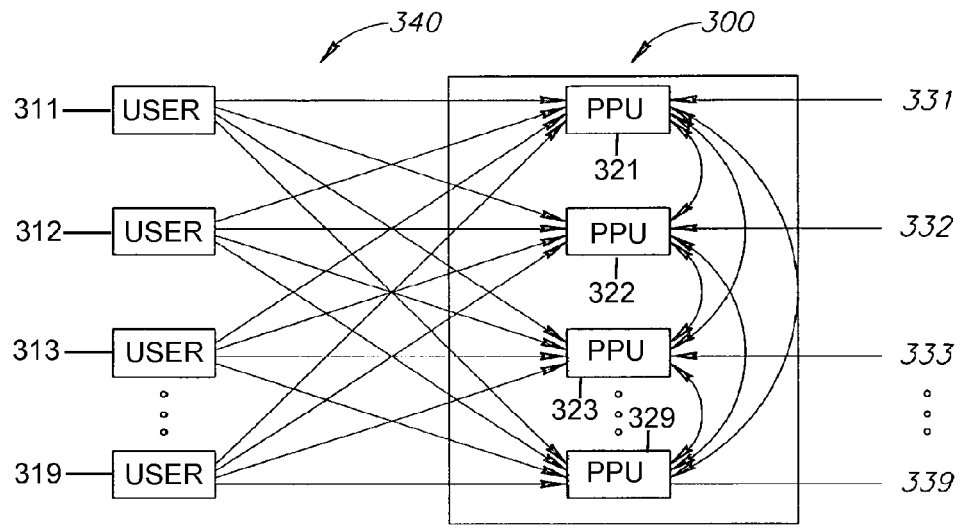
FIG. 3 is an exemplary block diagram illustrating a connection architecture according to an embodiment of the invention.

FIG. 3 is an exemplary block diagram illustrating an OFDMA scheduling device 300 according to an embodiment of the invention. By way of example, FIG. 3 depicts n available communication sub-channels, sub-channels 331, 332, 333 and up to sub-channel N, 339. It will be understood that FIG. 3 depicts an embodiment in which N is 4, but the invention is not limited in this respect, and any number of sub-channels N may be used that may be in accordance with any OFDMA communication protocol.

Parallel Processing Units (PPU) 321, 322, 323 and up to PPU N 329 may be used for each available communication sub-channel 331, 332, 333 and up to 339, respectively. Each PPU may output communication data to a respective communication sub-channel, for example, PPU 321 may output to sub-channel 331, PPU 322 may output to sub-channel 332 and PPU 323 may output to sub-channel 333, etc. All users may be connected to all PPUs. Thus, user 311 may be connected to all PPUs 321, 322, 323 and up to PPU N 329, and user 312 may likewise be connected to all PPUs 321, 322, 323 and up to PPU N 329, etc. Accordingly, any user may be able to utilize any paired combination of PPU and communication sub-channel.

According to embodiments of the invention, each PPU may be connected to every other PPU, for example, PPU 321 may be connected to PPU 322, PPU 323 and up to PPU N 329; PPU 322 may be connected to PPU 321, 323 and up to PPU N 329, and so on, where each connection may form a bidirectional communication path for exchange of control data as described further below. It will be noted that in some embodiments there may be two uni-directional paths between the PPU pairs. In another embodiment, the PPUs may each be PPUs may each be connected as spokes to a hub, which may receive and/or relay control information among the PPUs. In yet another embodiment of the invention, the PPUs may be connected in a daisy chain arrangement. It will be noted that other configurations for OFDMA scheduling device 300 are possible and within the scope of the invention.

In an embodiment of the invention, OFDMA scheduling device 300 may perform admission control that may allow at most N users that may be scheduled at a given time. In this embodiment, N may represent the number of sub-channels that may be available, and the corresponding number of PPUs in OFDMA scheduling device 300. OFDMA scheduling device 300 may have N inputs that may accommodate N users. OFDMA scheduling device may support modular operation, for example, adding, deleting, or modifying sub-channel allocation.

In some embodiments of the invention, a user may request to communicate over a plurality of sub-channels. OFDMA scheduling device 300 may replicate the input parameters of a user that may request a plurality of sub-channels over multiple times, and connect that user to a number of pairs of PPUs and communication sub-channels.

In an embodiment of the invention, each of users 311, 312, 313, and up to user N 319, may provide a Channel Quality Indicator (CQI) to an OFDMA scheduling device 300. A CQI may be provided by each user for every one of communication sub-channels 331, 332, 333 and up to communication sub-channel N, 339. Thus, for example, an arbitrary user i may send CQIs to scheduling device 300 for each of N sub-channels, represented by $w_{i1}$ for sub-channel 1, $w_{i2}$ for sub-channel 2, and up to $w_{iN}$ for sub-channel N. Each user up to N users may produce the CQI parameters for up to N sub-channels. There may be a total of up to N×N CQI parameters for the system, one parameter for each of the potential user-sub-channel connections represented by lines 340. The CQI for each sub-channel may be provided to the scheduling device 300, which may send the CQI parameters to the PPUs associated with each sub-channel. For example, PPU 322 may receive CQI parameter $w_{12}$ relating to the quality of connection of user 311 over sub-channel 332, CQI parameter $w_{22}$ relating to the quality of connection of user 322 over sub-channel 332, and up to CQI parameter $w_{N2}$ relating to the quality of connection of user 319 over sub-channel 332. In some embodiments of the invention, there may be less than N users. OFDMA scheduling device 300 may add null users to increase the total number of users, including both actual and null users, to N. A null user number of users, including both actual and null users, to N. A null user may provide a zero CQI input.

It will be understood that in this context, a user may be a device, for example, a mobile unit connected to a base station or access point. The CQI may be a dedicated parameter transmitted to the scheduling device 300, or it may be derived by the scheduling device 300 from a parameter included in the transmission protocol. It will be further understood that the channel quality indicator may be a direct measurement of the quality of the sub-channel, for example, a received signal strength indicator (RSSI), or a substitute or consequential indicator of sub-channel quality, for example, an error rate or lost packet counter.

Figure 4:
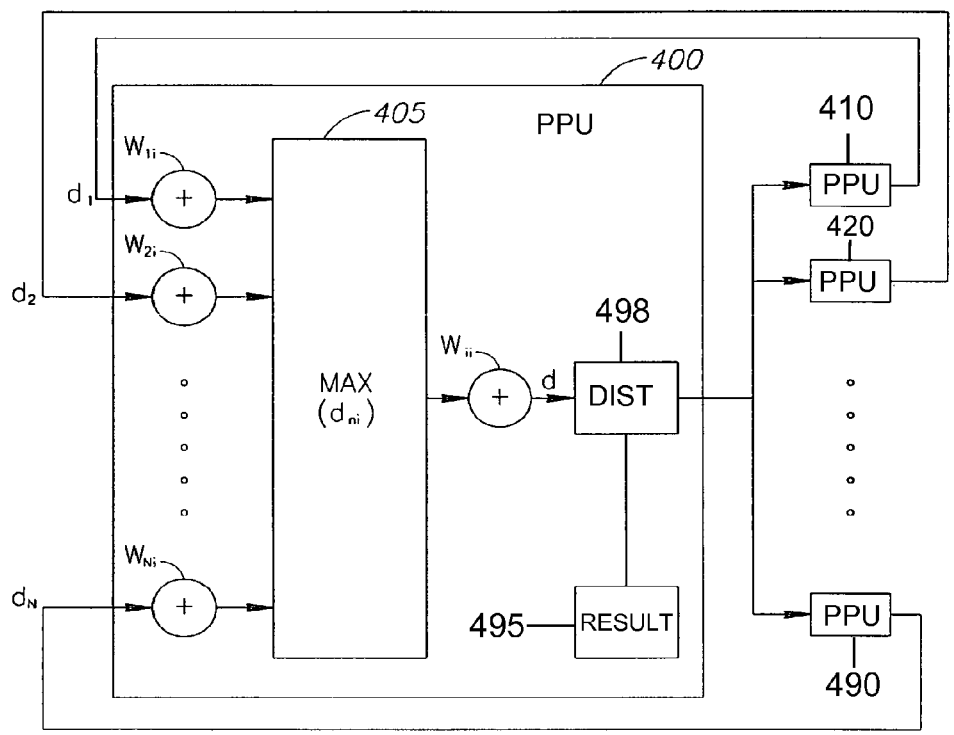
FIG. 4 is an exemplary block diagram illustrating connections of an element according to an embodiment of the invention.

FIG. 4 is a schematic block diagram illustrating a PPU 400 according to an embodiment of the present invention and some of its connections. Although the invention is not limited in this respect, and any number of PPUs N may be used that may correspond to N sub-channels that may be in accordance with any OFDMA communication protocol, FIG. 4 illustrates by way of example a PPU i 400 in greater detail and connections to other PPUs 410, 420 and up to PPU N, 490. PPU 400 may receive signals from other PPUs, for example, communication signal $d_1$ may be received from PPU 410, and may be combined in PPU 400 with a CQI $w_{1i}$, where i represents the serial number of the PPU, and CQI $w_{1i}$ may represent a parameter correlating to the sub-channel quality for user 1 over sub-channel i. Likewise, communication signal $d_2$ may be received from PPU 420 and may be combined in PPU 400 with a CQI $w_{2i}$, where CQI $w_{2i}$ may represent a parameter correlating to the sub-channel quality for user 2 over sub-channel i, and so on. PPU 400 may receive communication signal $d_N$ from PPU N 490 and may combine $d_N$ with a CQI $w_{Ni}$, where CQI $w_{Ni}$ may represent a parameter correlating to the sub-channel quality for user N over sub-channel i. The CQI parameters w and PPU output signals d may be combined using any suitable combiner, for example, using an adder, multiplier, or other combining circuit. The output of each combination unit may be a path weight for the user-sub-channel pair.

Calculation unit 405 may perform various calculations using all or some of the combined outputs of the combination units 1 to N. In an embodiment of the invention, calculation unit 405 may calculate a maximum path weight among the combined path weights. weights. The output of calculation unit 405 may be combined with a CQI $w_{ii}$ by another combination circuit, where CQI $w_{ii}$ may represent a parameter correlating to the sub-channel quality for user i over sub-channel i. PPU 400 may provide an output from distribution unit 498 to each of the other PPUs 410, 420 and up to PPU N 490. It will be understood that each of PPUs may operate substantially similarly to PPU 400. It will be noted that other configurations for OFDMA scheduling device 400 are possible and within the scope of the invention.

An embodiment of the invention may, for example, be used to allocate sub-channels to users, and may have values assigned to CQIs that may correspond to combinations of sub-channels and users.

Thus, to take an example, CQIs for a set of N sub-channels and N users where N is 4 may be as in the following table:

|    | U1 | U2 | U3 | U4 |
|----|----|----|----|----|
| C1 | 2  | 4  | 3  | 1  |
| C2 | 3  | 1  | 4  | 2  |
| C3 | 4  | 2  | 1  | 3  |
| C4 | 1  | 3  | 2  | 4  |

In this example, C1 through C4 may represent sub-channels 1 through 4, respectively, and U1 through U4 may represent users 1 through 4, respectively. A number 1 through 4 in the table may represent a CQI of a user that may operate on a sub-channel. For example, a CQI $w_{23}$ may have a value of 2, and may represent an indication of a signal quality of user U2 operating on sub-channel C3. A higher CQI may, for example, represent an improved quality of a user and sub-channel match.

A parallel processing unit, PPU0, may be developed by a system central processor for a purpose of establishing a connection architecture, and then may be removed from a resulting architecture. A parallel processing unit PPU0 may be a virtual parallel processing unit, and may have properties and features enabling it to operate in a similar fashion as an actual parallel processing unit 400. A parallel processing unit PPU0 may be used by a system central used by a system central processor during an initial assignment of PPUs to sub-channels and may aide in determining CQIs, as in the table of the example, which may be representative of a match between each user and sub-channel. A parallel processing unit PPU0 may be used in conjunction with other processing units. In some embodiments, an initial assignment of parallel processing units, users and sub-channels that may be based on CQIs, and may be developed by using a parallel processing unit PPU0, may be in accordance with a construction of a bipartite graph.

For example, PPU0 may be initially assigned to a first user and PPU1 may be initially assigned to a first sub-channel, $w_{11}$ may be determined to be 2, and a best match may be U1 to C1. A second sub-channel and a second user may be added by initially assigning PPU0 to a second user and PPU2 to a second sub-channel, $w_{21}$ may be found to be 4, $w_{12}$ may be found to be 3 and $w_{22}$ may be found to be 1, and a best match may be U1 to C2 and U2 to C1. This process may continue to use PPU0 to determine $w_{ij}$, and then construct a best match from a result. Following a best match allocation PPU0 may be removed from an allocation.

A distribution unit 498 that may be part of PPU 400 may function to compute a best match in accordance with an embodiment of the invention. In some embodiments, each distribution unit 498 may operate in conjunction with a system central processor. During intermediate computations or graph constructions distribution 498 may output results to PPUs 410, 420 and up to PPU N 490. Following user and sub-channel allocations, distribution unit 498 may provide a result 495 to a central system processing unit for user and sub-channel assignment. A result may be found following a convergence of a matching method, where a convergence of a method may be a result of a finite number of users and sub-channels. A finite number of users and sub-channels may allow for a relative comparison of matches, that may be based on CQIs or other indicators, of all possible combinations. In some embodiments, a bipartite graph may be used as an efficient way of a relative comparison of matches.

Figure 5:
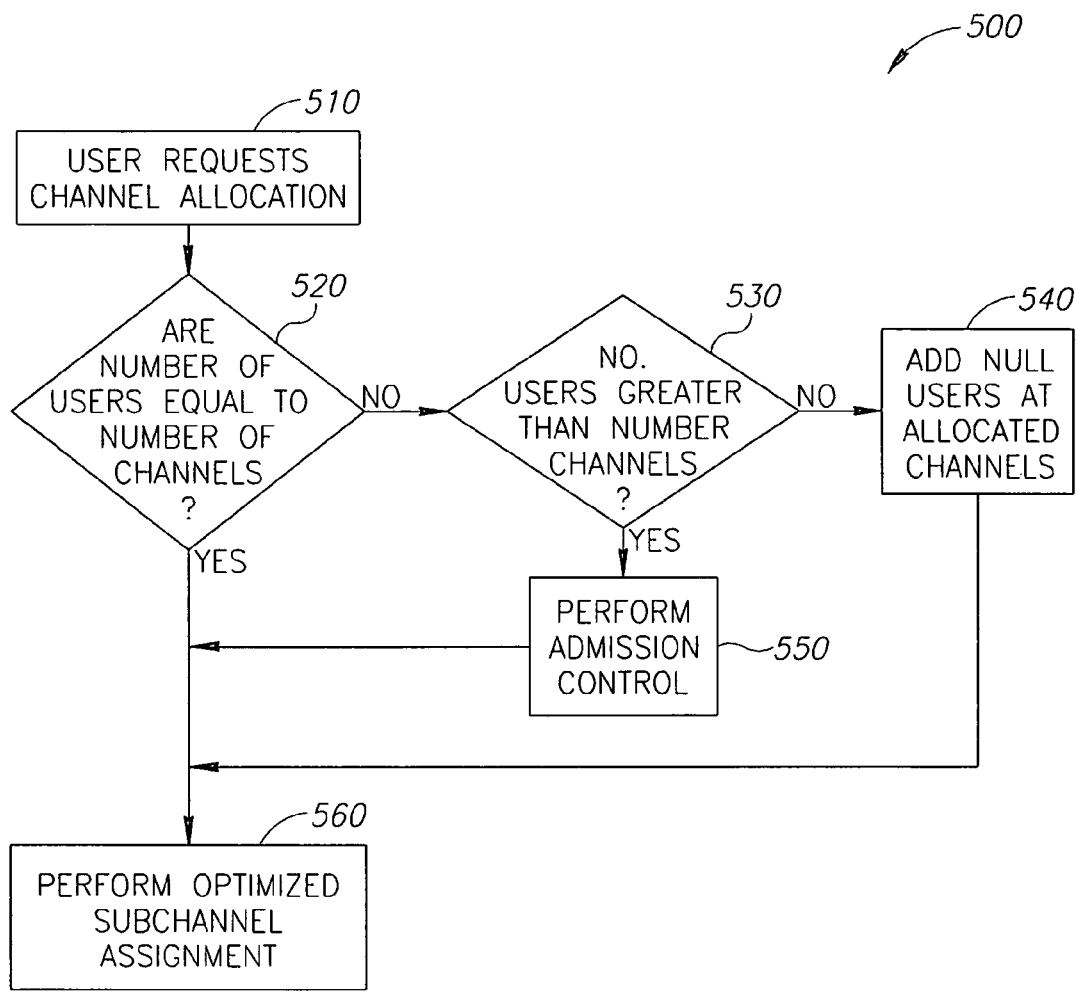
FIG. 5 is an exemplary flowchart illustrating a method in accordance with an embodiment of the present invention.

FIG. 5 is a flowchart 500 illustrating a method in accordance with embodiments of the present invention that may be used to allocate users. At block 510 a user may request a sub-channel allocation in order to allow the user to communicate using an OFDMA protocol. At block 520, it may be determined, for example, by an OFDMA scheduling device, whether scheduling device, whether the total number of users requesting access to the system is the same as the number of sub-channels available in the OFDMA system. If the number of users is the same as the number of sub-channels, the method may proceed to block 560, where optimization of sub-channel assignments to each of the users may be performed. If the number of users requesting access to the OFDMA system is not equal to the number of sub-channels available, it may be determined at block 530 whether the number of users is greater than or less than the number of sub-channels available. When the number of users is greater than the number of sub-channels available, admission control may be performed at block 550 and the number of users may be limited. When the number of users is less than the number of sub-channels available, null users may be added at block 540 to any unallocated sub-channel. Following admission control at block 550 or addition of null users at block 540, optimization of sub-channel assignments to each of the users may be performed at block 560. Alterations or permutations such as modifications, additions, or omissions may be made to the method without departing from the scope of the invention. The method may include more, fewer, or other steps.

Figure 6:
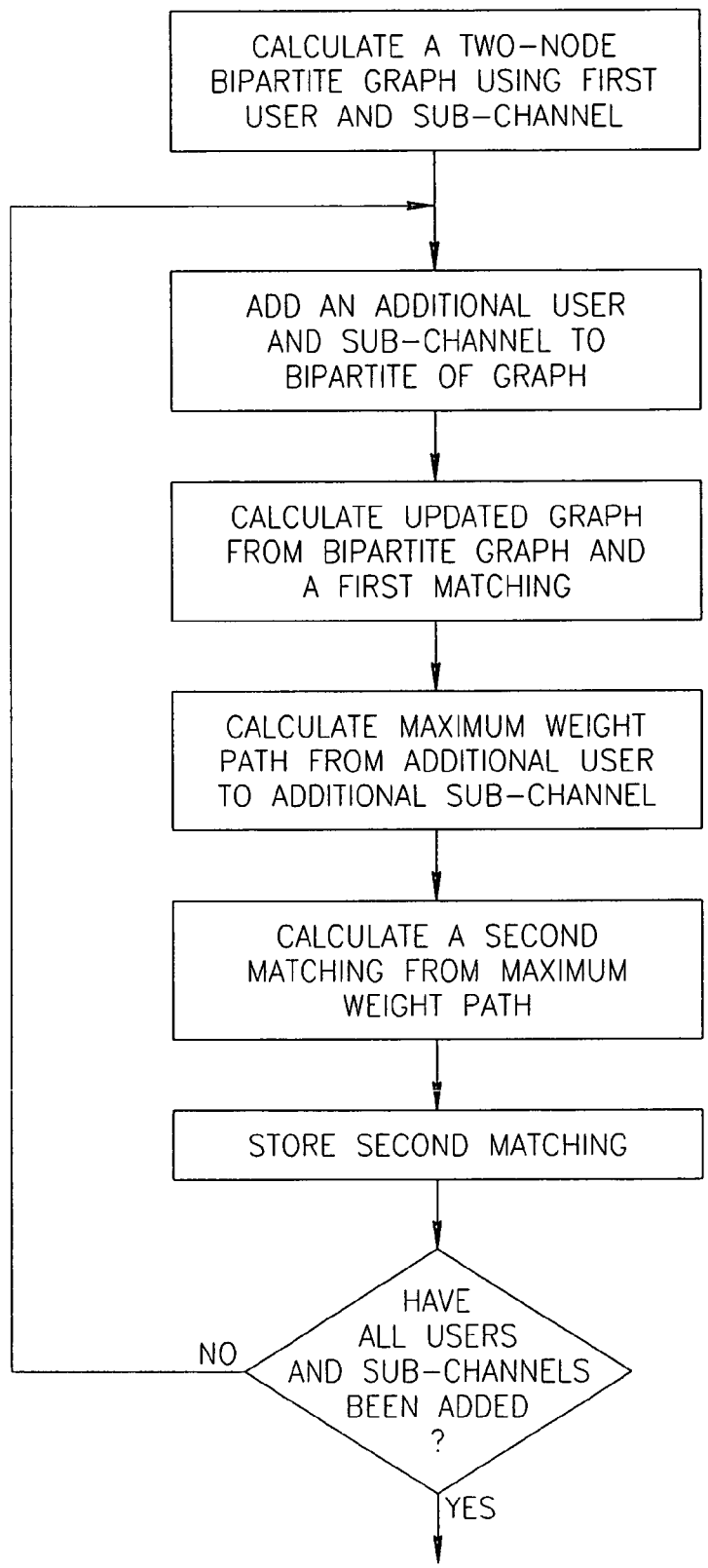
FIG. 6 is an exemplary flowchart illustrating a calculation method in accordance with an embodiment of the present invention.

FIG. 6 is a flowchart 600 illustrating a method that may be used to perform an optimization of sub-channel assignments in an OFDMA system in accordance with embodiments of the present invention. Generally, the method may create a graph by first a first user and sub-channel, and adding further users and sub-channels, and repeating. In some embodiments of the invention, flowchart 600 may be at least partially included or used in conjunction with, for example, block 560 of FIG. 5. At block 610, information from a first user $u_1$ and information from a first sub-channel $v_1$ may be used to calculate a first graph that may be a two-node bipartite graph G, where a first matching M may be an only edge in G, G: M=E(G). A second user $u_i$ and a second sub-channel $v_i$ may be added to a first graph at block 620 by adding to each side of G, and the addition to G may be completed by adding edges.

At block 630, a second graph $\overline{G}$, which may be referred to as an alternate graph, may be calculated using a first graph G and a first matching M. At block 640, a maximum weight path P, which may be from a second user $u_i$ to a second sub-channel $v_i$, may calculated, and P may be within $\overline{G}$.

At block 650, a second matching that may be referred to as a maximum weight bipartite matching (MWBM) may be calculated from a maximum weight path P, $(M-M_p) \cup M'_p$, where $M_p$ and $M'_p$ may correspond to vertices and edges of P, respectively.

At block 660 a MWBM may be stored and used in additional calculations at a later time.

At block 670, it may be determined whether all users have been assigned to corresponding sub-channels, and the method may repeat from block 620 to add additional users to additional sub-channels until all users have been assigned to corresponding sub-channels. Alterations or permutations such as modifications, additions, or omissions may be made to the method without departing from the scope of the invention. The method may include more, fewer, or other steps.

Figure 7:
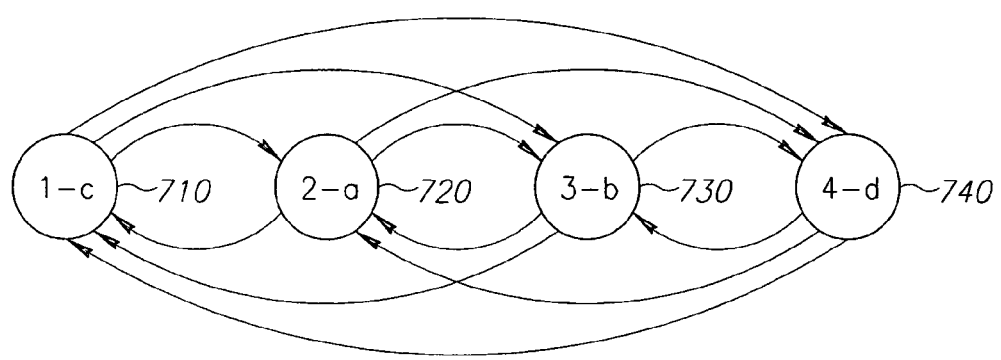
FIG. 7 is an exemplary block diagram illustrating connections of a graph in accordance with an embodiment of the present invention.

FIG. 7 is an exemplary block diagram 700 according to an embodiment of the invention illustrating a bipartite alternate graph. Block 710 illustrates, for example, a matching that may be between a user 1 and a sub-channel c, block 720 illustrates a matching that may be between a user 2 and a sub-channel a, block 730 illustrates a matching that may be between a user 3 and a sub-channel b and block 740 illustrates a matching that may be between a user 4 and a sub-channel d. Although the invention is not limited in this respect, and any number of users may be used that may correspond to N sub-channels that may be in accordance with any OFDMA communication protocol. Block diagram 700 illustrates connections that may be formed from the construction and calculation of a bipartite alternate graph.

In an embodiment of the invention, a matching M may be on a graph G, where M may be a subset of the edges of G, and each vertex in G may connect to no more than one edge in M. A bipartite graph may contain two sets of vertices that may be disjoint, and the vertices that may be in a first set may be connected to vertices in a second set by direct edges. A matching that may be on a bipartite graph may be called a bipartite matching. For example, FIG. 2A may illustrate a bipartite graph 200 and FIG. 2B may illustrate a bipartite matching 250 that may correspond to bipartite graph 200. A path $P=\{v_0 e_0 v_1 e_1 \ldots e_{n-1} v_n\}$ may be defined within a graph and may be a finite sequence of alternating vertices and edges, and may begin and end and edges, and may begin and end with a vertex. Every vertex $v_i$ may be directly connected to a vertex $v_{i+1}$ by an edge $e_i$. A simple path may be a path where each vertex may be included once. A circle may be a case of a simple path that may have $v_o 32 v_n$.

In an embodiment of the invention, G may be formed as a function of a first set of 1 through n nodes, or left nodes, that may be referred to as U, a second set of n+1 through 2n nodes, or right nodes, that may be referred to as V, and a set of directed edges of G, that may be referred to as E, and G may be G(U,V,E). E may be defined as: $E=\{e_{ij} | i \in U, j \in V\}$. Matching pairs M may consist of a set of elements as $M=\{(a_1,b_1), \ldots, (a_k,b_k)\}$. An alternate graph $\overline{G}$ may be constructed where a node i that may be in $\overline{G}$ may correspond to a matching pair $\{a_i,b_i\}$ in a matching M. A weight of each edge may be defined as $\overline{w}_{ij}=w(a_i,b_j)$ and $\overline{w}_{ji}=w(b_i,a_j)$. A cost function, c, may also be defined as $c_i=-w(a_i,b_i)$ FIG. 7 may represent an alternate graph $\overline{G}$ 700 that may have been constructed from a bipartite graph G 250, referring also to FIG. 2b.

In an embodiment of the invention, alternate graph $\overline{G}$ may be constructed from a bipartite graph G and a matching M of G. A simple path P that may be in $\overline{G}$ may correspond to a matching M that may be in G. A weight of P may be a difference between a weight of a second matching $M'_p$ and a first matching $M_p$. $M_p$ may be a matching that may correspond to vertices in P. P may be a simple path, and $P=\{v_0 e_0 v_1 e_1 \ldots e_{n-1} v_n\}$. $\overline{G}$ may be constructed, and $v_0, v_1, \ldots, v_n$ may correspond to one or more matching pairs $M_p$, where $$M_p = \{(a_{p_0}, b_{p_0}), \ldots (a_{p_n}, b_{p_n})\} \subset M,$$

and where $e_0, e_1, \ldots, e_{n-1}$ may correspond to edges, as $\{e(a_{p_0}, b_{p_1}), \ldots e(a_{p_{n-1}}, b_{p_n})\}=M'$. Each of the vertices in P may be unique, and M' may be a matching in G, and may have pairs $M_p = \{(a_{p_0}, b_{p_1}), \ldots (a_{p_{n-1}}, b_{p_n})\} \subset M$. A weight of P, $W_p$, may be calculated by:

$$W_P = \sum_{i=0}^{n-1} w_{v_i,v_{i+1}} + \sum_{i=0}^{n-1} c_{v_i}.$$

A weight of matching pairs, $W_{MP}$, may correspond to composite nodes that may be in path P, and $$W_{M_P} = -\sum_{i=0}^{n-1} c_{v_i}.$$

A second matching may be M', and a weight of a second matching, $W_{M'}$, may be $$W_{M'} = \sum_{i=0}^{n-1} w_{v_i,v_{i+1}}.$$

A path weight, $W_p$, may be a difference of a weight of a first matching weight, $W_{MP}$, and a second matching weight, $W_{M'}$, $W_p = W_{M'} - W_{M_p}$.

In an embodiment of the invention, C may be a circle in $\overline{G}$, and $C=\{v_0 e_0 v_1 e_1 \ldots e_{n-1} v_n e_n v_0\}$. A matching $M_C$ may correspond to vertices $\{v_0 \ldots v_n\}$, and a matching $M_{C'}$ may correspond to edges $\{e_0 \ldots e_n\}$, and $(M-M_C) \cup M'_C$ may also be a matching in G. C may be a circle, and a first matching $M_C$ and a second matching $M_{C'}$ may contain a common set of vertices. A third matching $\overline{M}_C$ may also be a matching, and $\overline{MC}=M-M_C$. $\overline{M}_C$ and $M_C$ may have disjoint vertices and $\overline{MC}$ and $M'_C$ may have disjoint vertices. A matching may also be $\overline{MC} \cup M'_C$.

In an embodiment of the invention, M may be a MWBM, and may have size n, and be of a bipartite graph that may have 2n nodes, and may have a weight $W_M$. Alternate graph $\overline{G}$ may be constructed from G and M. A circle in $\overline{G}$ may have a weight that is not positive. C may be a circle in $\overline{G}$, where $C=\{v_0 e_0 v_1 e_1 \ldots e_{n-1} v_n e_n v_0\}$. $M_C$ may be a first matching that may correspond to vertices, and may have a weight $W_{MC}$, and $M'_C$ may be a second matching, and may have a weight $W_{MC'}$, that may correspond to edges. M' may be a third matching, where $$M'=(M-M_C) \cup M'_C,$$

and M' may have a size n and may be in G. A weight of M', $W_{M'}$, may be $$W_{M'}=W_M-W_{MC}+W_{MC'}$$

and a weight of a circle, $W_C$, may be $$W_C = W_{M'_C} - W_{M_C} = W_{M'} - W_M \leq 0.$$

G(U,V,E) may be fully connected, may be weighted and may be a bipartite graph, and may have m nodes, and m may be equal to 2n. G' may be a graph that may be constructed from G and an addition of a node to each side of G, and an addition of edges sufficient to fully connect G'. G' may be a weighted bipartite graph, G'(U', V', E'), and may have m+2 nodes, and $$U' = U \cup u_0, V' = V \cup v_0 \text{ and } E' = E \cup E_0 \cup E_1,$$

$$E_0 = \{(u_0, v): \forall v \in V' \text{ and } E_1 = \{(u, v_0): \forall u \in U'.$$

$\overline{G}'$ may be an alternate graph of G', and may be constructed by adding $u_0$, $v_0$, $E_0$ and $E_1$ to $\overline{G}$. A cost that may be of nodes $u_0$ and $v_0$ may be zero.

In an embodiment of the invention, P may be a maximum weight path from $u_0$ to $v_0$, and may be in graph $\overline{G}'$. $M_p$ and $M'_p$ may be a first and second matching in G, respectively, and may correspond to vertices and edges of P, respectively. A MWBM matching, M', of G' may be $$M' = (M - M_p) \cup M'_p. \hat{M}'$$

may be a matching that may have a size of n+1, and may be in G'. $u_0$ may be connected to a first vertex, $b_{k_1}$, and may be in G', and may be mapped to a combo-node, $v_{k_1}$, that may also be in $\overline{G}'$. A second vertex, $a_{k_1}$, may be connected to a first vertex, $b_{k_1}$ and may be of $v_{k_2}$. $\hat{M}'$ may be a one-on-one mapping of n+1 left nodes to n+1 right nodes. A sequence may continue until a vertex $a_{k_e}$ may be connected to $v_0$. In $\hat{M}'$ there may be a subset of matching pairs, $\{(u_0, b_{k_1}), (a_{k_1}, b_{k_2}), \ldots, (a_{k_{e-1}}, b_{k_e}), (a_{k_e}, v_0)\}$, that may correspond to a simple path P that may be between $u_0$ and $v_0$, and may be in $\overline{G}'$, and may have vertices that may have a sequence, $u_0 v_{k_1} \ldots v_{k_e} v_0$. $M'_p$ and $M_p$ may be constructed from path P. $M'_p$ may contain all of the vertices that may be in $M_p$, and may also contain two additional vertices $u_0$ and $v_0$. M' may then be a matching that may have a size n+1, and may be in G', and may have a weight, $W_{\hat{M}'}$, and $W_{\hat{M}'} = W_M - W_{M_p} + W_{M'_p} = W_M + W_P$. There may be a maximum weight path, $P_0$, that may not contain any circle, and $M_{p_0}$ and $M'_{p_0}$ may be constructed from $P_0$, and $M'_0 = (M - M_{P_0}) \cup M'_{P_0}$ and $W_{M'_0} = W_M + W_{P_0} \geq W_{\hat{M}'}$. $M'_0$ may be a MWBM and may have a size n+1.

In an embodiment of the invention, a MWBM for m nodes may be constructed, and may start from two nodes. Each step may include an addition of a node to each side of a bipartite graph to an existing graph. An optimal matching of an extended graph may be found by computing a maximum weight path that may be between an existing graph and a graph that may have added nodes.

An OFDMA system may have N sub-channels, which may be allocated to M concurrent users, and may be in a given frame. Each user may be allocated more than one sub-channel, or some sub-channels may not be allocated to any user. Virtual nodes may be created, and if a user may need m sub-channels, a user may be mapped to m virtual nodes. Null users may have zero weight and may be added as necessary. Following creation of virtual nodes, as necessary, an allocation may be performed as in exemplary FIG. 5.

In an embodiment of the invention, a MWBM, M, may be a first matching, and may be of a first graph, G. A matching pair $\{u_i, v_j\}$ may be removed from M and G, and a second matching, M', may be formed, where M' may be a MWBM and may be in a second graph, G'. This MWBM allocation may allow a user to be added, deleted or modified. A deletion may be accomplished by removing a node node $u_i$ and as matching sub-channel $v_i$ from M and G, and a result may be M' and G'. A null node and a sub-channel $v_i$ may be added to G', and a corresponding MWBM may be found. A node may be added when a null node may be in an existing allocation. A null node may be removed with a corresponding sub-channel, and a new node may be added, and the corresponding sub-channel may be returned. A node may be modified by removing a node and a corresponding sub-channel, modifying a node, and returning a node and a corresponding sub-channel that may have modified weights.

While certain features of the invention have been illustrated and described herein, many modifications, substitutions, changes, and equivalents will now occur to those of ordinary skill in the art. It is, therefore, to be understood that the appended claims are intended intended to cover all such modifications and changes as fall within the spirit of the invention.

What is claimed is:

1. A method comprising:
   receiving, at a wireless communication device, a plurality of requests from a plurality of users for allocation of orthogonal frequency division multiple access (OFDMA) sub-channels;
   obtaining a channel quality index for each of said users over each sub-channel of the OFDMA system;
   calculating an optimization of sub-channels based on said channel quality indices, wherein calculating the optimization includes determining a first graph including a first user node corresponding to a first user of said users and a first sub-channel node corresponding to a first sub-channel of said sub-channels, adding to the first graph a second user node corresponding to a second user of said users and a second sub-channel node corresponding to a second sub-channel of said sub-channels, determining a second graph based at least on said first graph, and determining a maximum weight path from said second user node to said second sub-channel node in the second graph; and
   allocating, by said wireless communication device, said plurality of OFDMA sub-channels to said plurality of users based on said maximum path weight.

2. The method of claim 1, further comprising communicating with each of said users over said allocated sub-channel.

3. The method of claim 1, wherein calculating the optimization comprises:
   combining said maximum path weight with a channel quality index for the second sub-channel.

4. The method of claim 1, wherein calculating the optimization includes:
   calculating a first edge of said first graph from a first matching calculated from said first user node and said first sub-channel node;
   calculating a second edge from a second matching calculated from said second user node and said second sub-channel node,
   wherein determining said second graph includes determining said second graph based at least on said first graph, said second edge, said second user node, and said second sub-channel node.

5. The method of claim 4, wherein calculation of said optimization further comprises:
   subtracting said second user node and said second sub-channel node from said second graph;
   modifying said second user node;
   adding the modified second user node and said second sub-channel node to said second graph;
   calculating a third matching from said modified second user node and said second sub-channel node;

calculating a third edge from said third matching;
calculating a third graph from at least said second graph; and
calculating a maximum weight path from said modified second user node to said second sub-channel node within said third graph.

6. The method of claim 1, wherein said first graph and said second graph are bipartite graphs.

7. The method of claim 1, further comprising storing said first graph and said second graph in a memory.

8. The method of claim 1, wherein said OFDMA system is a wireless network system.

9. The method of claim 1, wherein said allocation further comprises allocation of two or more sub-channels to each of one or more of said users, based on admission control requests of said users.

10. The method of claim 1, wherein said allocation further comprises allocation of one or more sub-channels to one or more null users, based on said optimization.

11. A system comprising:
a wireless server adapted to communicate with a plurality of users using an Orthogonal-Frequency-Division-Multiple-Access (OFDMA) protocol, wherein the wireless server is adapted to receive from said users a plurality of channel quality indices relating to a quality of communication for the users over plurality of sub-channels,
wherein said wireless server comprises an allocation unit to calculate optimal allocation of the sub-channels to said users based on said channel quality indices, wherein said allocation unit comprises:
a plurality of processing units to generate a plurality of path-weight outputs corresponding to said plurality of said sub-channels, respectively, wherein a processing unit corresponding to a sub-channel of said sub-channels is connected to receive an output of every other processing unit of said processing units, and wherein the processing unit is to determine a plurality of path weights based on channel quality indices for the users over said sub-channel and based on path-weight outputs of other sub-channels, to select a maximum path weight of said plurality of path weights, and to generate a path-weight output corresponding to said sub-channel by combining said maximum path weight with a channel quality index for the sub-channel.

12. The system of claim 11, further comprising a transmitter connected to said server to communicate with said users over the allocated sub-channels.

13. The system of claim 11, wherein said allocation unit is to determine a first graph including a first user node corresponding to a first user of said users and a first sub-channel node corresponding to a first sub-channel of said sub-channels, to add to the first graph a second user node corresponding to a second user of said users and a second sub-channel node corresponding to a second sub-channel of said sub-channels, to determine a second graph based at least on said first graph, to determine a maximum weight path from said second user node to said second sub-channel node in the second graph, and to allocate said plurality of sub-channels to said plurality of users based on said the maximum path weight.

14. The system of claim 13, wherein said first graph and said second graph are bipartite graphs.

15. The system of claim 13, wherein said server further comprises a memory to store said first graph and said second graph.

16. The system of claim 13, wherein said allocation unit is to calculate the optimal allocation by:
subtracting said second user node and said second sub-channel node from said second graph;
modifying said second user node;
adding a modified second user node and said second sub-channel node to said second graph;
calculating a matching from said modified second user node and said second sub-channel node;
calculating an edge from said matching;
calculating a third graph from said second graph; and
calculating a maximum weight path from said modified second user node to said second sub-channel node within said third graph.

17. The system of claim 16, wherein said second user node is a calculated from a null user.

18. The system of claim 11, wherein said allocation unit is to calculate the optimal allocation by allocation of two or more sub-channels to each of one or more of said users, based on admission control requests of said users.

19. The system of claim 11, wherein said allocation unit is to calculate the optimal allocation by allocation of one or more sub-channels to one or more null users based on said optimization.

* * * * *

UNITED STATES PATENT AND TRADEMARK OFFICE
CERTIFICATE OF CORRECTION

| | | |
|---|---|---|
| PATENT NO. | : 7,936,836 B2 | Page 1 of 1 |
| APPLICATION NO. | : 11/902948 | |
| DATED | : May 3, 2011 | |
| INVENTOR(S) | : Yin | |

It is certified that error appears in the above-identified patent and that said Letters Patent is hereby corrected as shown below:

In column 11, line 27, in Claim 11, delete "plurality" and insert -- a plurality --, therefor.

In column 12, line 36, in Claim 17, delete "is a calculated" and insert -- is calculated --, therefor.

Signed and Sealed this
Sixteenth Day of August, 2011

David J. Kappos
*Director of the United States Patent and Trademark Office*